Jan. 22, 1924.
W. V. ORR
1,481,481
WRINGING MACHINE
Filed Oct. 25, 1920
2 Sheets-Sheet 1
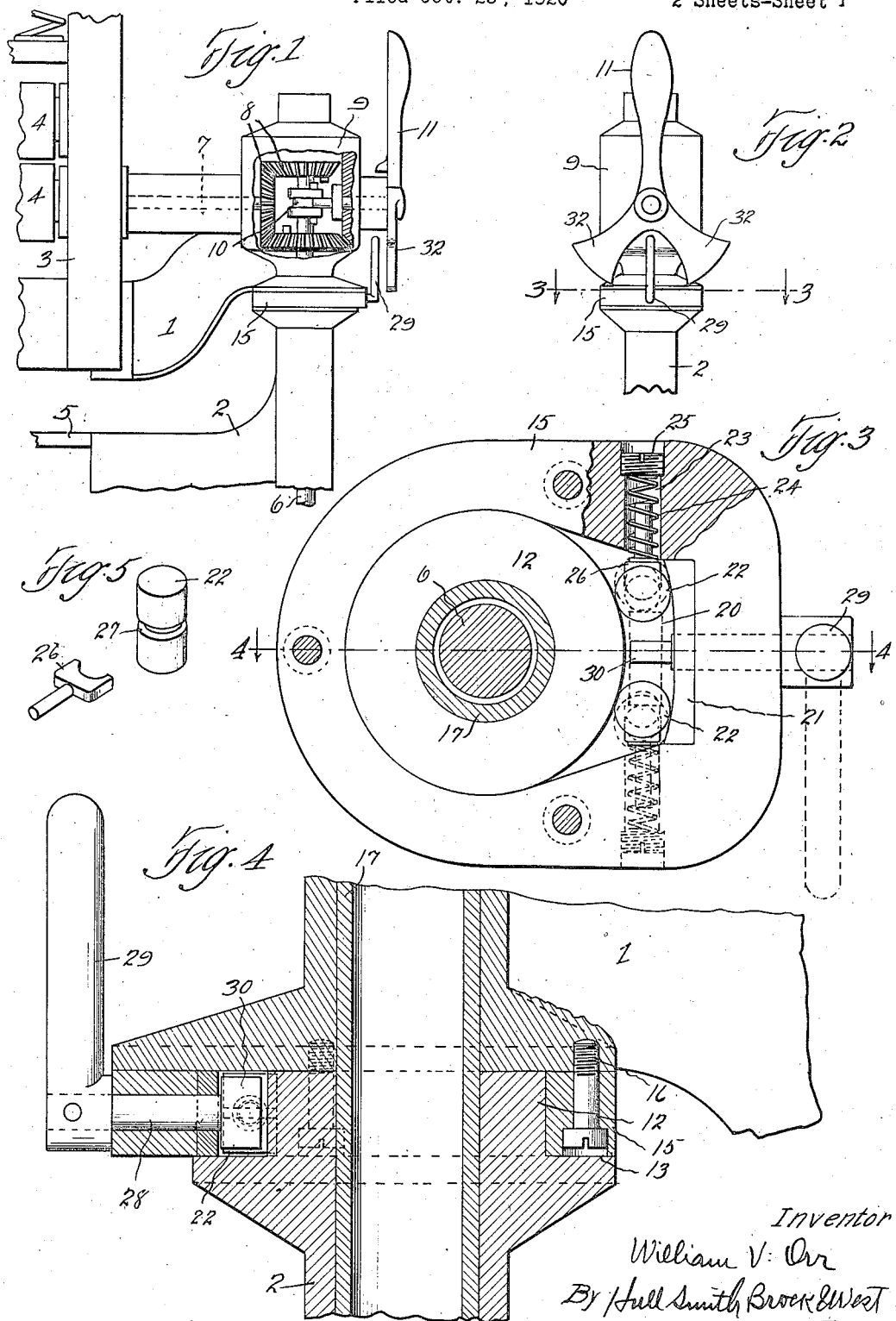
Inventor
William V. Orr
By Hull Smith Brock & West
Attys.

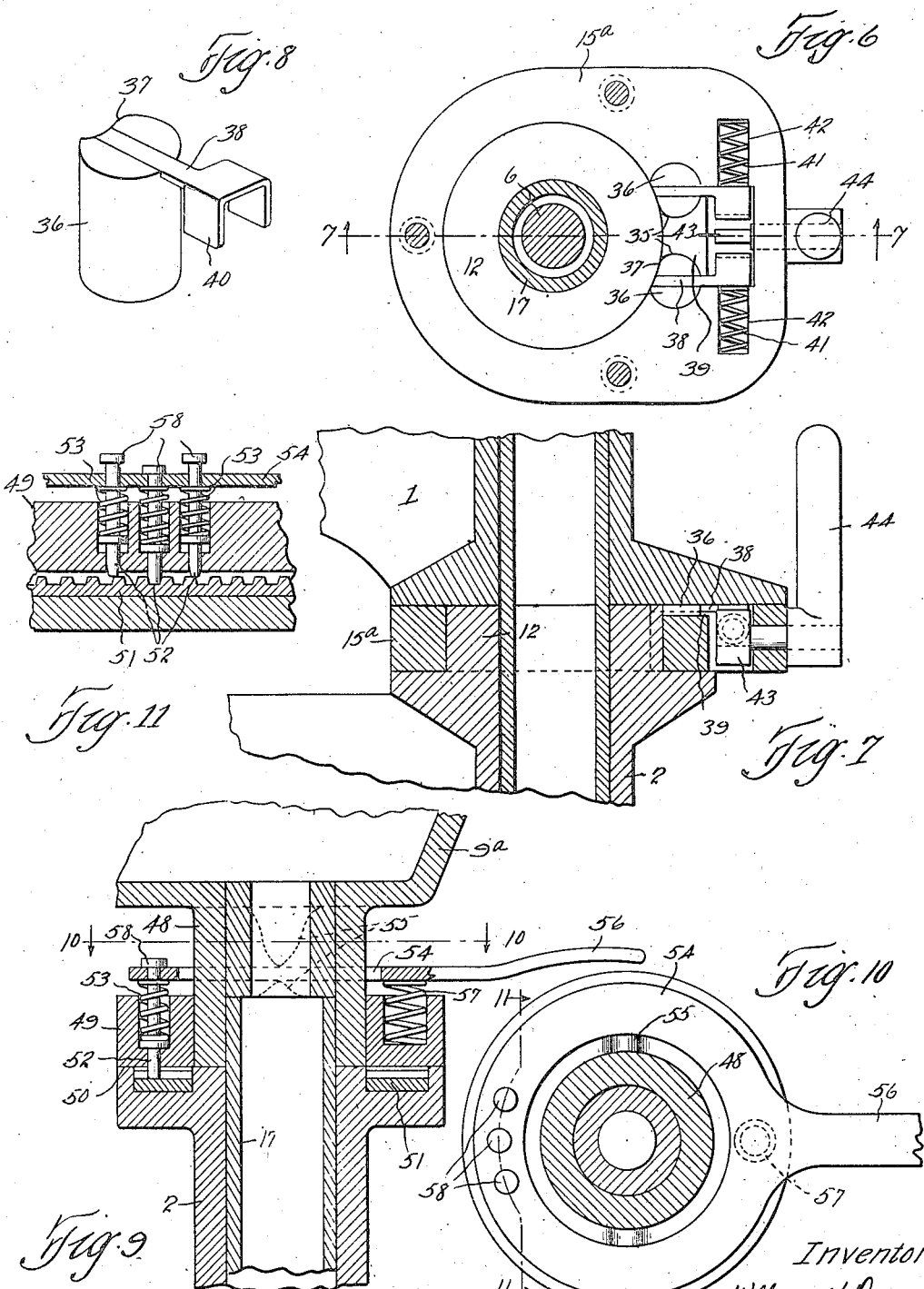

Patented Jan. 22, 1924.

1,481,481

UNITED STATES PATENT OFFICE.

WILLIAM V. ORR, OF CLEVELAND, OHIO.

WRINGING MACHINE.

Application filed October 25, 1920. Serial No. 419,247.

*To all whom it may concern:*

Be it known that I, WILLIAM V. ORR, a citizen of the United States, residing at Cleveland, in the county of Cuyahoga and State of Ohio, have invented a certain new and useful Improvement in Wringing Machines, of which the following is a full, clear, and exact description, reference being had to the accompanying drawings.

This invention relates to wringing machines and especially to those of the type arranged to swing around a vertical axis and driven by a vertical shaft concentric with said axis so as to be operated equally well in all positions. With such a device any obstruction to the rotation of the rolls, either by the insertion of an amount of fabric or merely by the pressure of the tension spring tends to produce a lateral swinging of the entire frame and if the mechanism be started without first locking the wringer frame it is possible for serious personal injury to result.

The objects of this invention are the provision of a device which cannot be left unlocked; which will instantly become fastened at any point to which it is moved; which shall be inconvenient to unlock while the parts are in motion; which shall be both safe and convenient to use; which shall be simple, reliable, and inexpensive; while further objects and advantages of the invention will become apparent as the description proceeds.

In the drawings accompanying and forming a part of this application I have shown certain illustrative embodiments of my invention although without intent to limit myself to the particular structure shown therein. In these drawings Fig. 1 illustrates a portion of a swinging wringer and its support having my improvements applied thereto; Fig. 2 is a face view of the parts shown in Fig. 1; Fig. 3 is a horizontal sectional view corresponding to the line 3—3 of Fig. 2 and drawn to enlarged scale; Fig. 4 is a vertical sectional view corresponding to the line 4—4 of Fig. 3; Fig. 5 is a detail view of the clutch member; Fig. 6 is a view corresponding to Fig. 3 but showing a modified type of clutch mechanism; Fig. 7 is a vertical sectional view corresponding to the line 7—7 of Fig. 6; Fig. 8 is a perspective view of one of the clutch members employed in Figs. 6 and 7; Fig. 9 is a vertical sectional view through another modified form of locking mechanism; Fig. 10 is a horizontal sectional view corresponding to the line 10—10 of Fig. 9; and Fig. 11 is a detail view corresponding to the broken line 11—11 of Fig. 10.

Describing the parts by reference characters 1 and 2 represent a pair of brackets pivoted together upon a vertical axis, the bracket 1 carrying a framework 3 provided with rolls 4—4 constituting a clothes-wringer, and the bracket 2 being secured to a suitable support 5 such as the body of a washing machine. Journaled in the bracket 2, concentric with the pivot axis, is a driving shaft 6, and journaled in the bracket 1 perpendicular thereto is a driven shaft 7 connected to one of the rolls, the two shafts being connected together by suitable gearing 8 located in the hollow head 9 carried by the bracket 1. In the present embodiment this gearing is of the reversing type and includes a slidable clutch spool 10 controlled by a handle 11 carried by and movable with this head, the parts being so arranged that the rolls will be rotated in one direction or the other depending upon the way this handle is turned and will be at rest when the handle is in intermediate position. It will be understood that my invention is not restricted to the location of this handle and gearing upon any particular bracket.

Referring now particularly to Figs. 1 to 5, the upper end of the bracket 2 is shown as formed or provided with an exteriorly rounded portion 12 projecting vertically above the flat circular ledge 13, and interposed between this ledge and the flat bottom face of the head 9 is a flat-faced section 15, removably attached to the bracket 1 by suitable means such as the screws 16. A hollow sleeve 17 is rigidly secured in the bracket 1 and depends loosely into the bracket 2 to hold the parts in line and constitute a pivot bearing.

One side of the section 15 is recessed as shown at 20 and provided with a hard metal wear plate 21 between which and the surface of the member 12 are inserted a pair of clutch rollers 22—22. Formed in the wall of the section opposite each of these rollers is a recess 23 containing a spring 24 forcing the corresponding roller always towards engaging position. In the present embodiment the outer end of each spring rests against a screw plug 25 while its inner end presses upon a yoke 26 engaging a central groove 27 formed in the roller. Pivoted upon a radial axis between the rollers is a rock shaft 28 having at its outer end a handle 29 and at its inner end a cam 30 which when rocked towards horizontal position engages the rollers 22—22 forcing them out of engagement against the tension of their springs. These rollers being oppositely disposed are enabled to prevent rotation of the bracket in either direction regardless of the swinging tendency of the shaft 6 or the efforts of the operator to draw a heavy piece of goods through the wringer. The exterior of the member 12 being uniform the rollers engage the same in securing relation whatever be the relative position of the brackets as a result of which the parts are firmly secured at all times except while the handle 29 is forcibly displaced. While there is little likelihood that the user will disengage this locking device during the operation of the wringer, owing to the fact that such wringer operation itself tends to wedge the active roller very tightly, still in order to form a further safeguard I have shown the handle 11 as extended upon each side to constitute wings 32—32, which swing freely over the handle 29, being so arranged as to permit easy access to this handle when the clutch is in central or disengaged position, but to impede access thereto when the clutch is in either of its engaged positions.

In the embodiment shown in Figs. 6, 7 and 8, the section 15$^a$ is provided at one side of its main aperture with a pair of spaced circular recesses 35 opening thereinto and each receiving a clutch roller 36. The face of each of these rollers is slightly relieved at one side as shown in exaggerated degree at 37, and the end of each is formed with a transverse slot receiving the arm 38 of an operating lever, the face of the section being suitably recessed as shown at 39 for the reception of the same. The outer end of each lever is formed with a depending portion 40 engaged by the spring 41 and likewise received in a depression 42 cast in the face of the section; while between the two levers is mounted the unlocking cam 43 operated by the handle 44 in the manner heretofore described.

Referring now to Figs. 9, 10 and 11, the head 9$^a$ is shown as provided with a depending neck 48 having secured therearound the collar 49 which rests upon the upwardly facing shoulder 50 of the bracket 2. Located in an annular groove in this shoulder is the upwardly facing toothed member 51, and carried by the section 49 are a plurality of vertically movable pins 52 adapted to enter the spaces between the teeth of said member. The spacing of these pins is so chosen that one of the same can at all times enter a notch, a plurality of pins being provided to enable this to be accomplished without back-lash. Independent springs 53 are provided for the different pins, together with means for withdrawing all said pins simultaneously when it is desired to swing the wringer. The last named means here consists of a ring 54 pivoted in its own plane between opposed ears 55 carried by the neck 48 and collar 49. One side of this ring is provided with a projecting handle 56 and beneath it the collar is provided with a spring 57 normally holding it in elevated position; at its opposite side this ring is apertured for the reception of the various pins as shown in Figs. 9 and 11, the springs 53 being seated against the lower face of the ring and the pins having enlarged heads 58 above the ring, so that when the handle 56 is depressed all these pins will be withdrawn simultaneously.

It will be understood that my invention is independent of the nature or location of the reversing gear or whether that gear is carried by the movable part or the fixed part of the machine; it is likewise immaterial to my invention whether the locking device and the handle which operates the same be carried by the movable bracket or the fixed bracket; and generally that I do not limit myself to any of the details herein shown except as the same are recited in the claims hereto annexed.

Having thus described my invention what I claim is:

1. In a device of the character described the combination with a pivoted frame, a driving shaft concentric with the pivot axis and mechanism carried by said frame adapted to be driven by said shaft, of spring actuated means normally locking said frame immovably to its support, said means operating equally in all positions of said frame.

2. In combination a clothes wringer mounted to swing on a vertical axis, a drive shaft geared to the wringer rolls and concentric with such axis, and a spring lock equally operative at all positions of said wringer to lock said wringer against swinging.

3. In combination a clothes wringer mounted to swing on a vertical axis, a drive shaft geared to the wringer rolls and passing through such axis, a manually movable member for controlling the connection between shaft and rolls, and a spring lock normally holding said wringer against rotation, said lock being equally operative in all positions of said wringer and its handle being so located relatively to said movable member as to be shielded thereby from operation when the same is in driving position.

4. In combination a clothes wringer mounted to swing on a vertical axis, spring actuated locking means normally securing said wringer against swinging movement, a drive shaft concentric with the pivot axis, gearing for connecting said shaft to the wringer rolls, a handle for disengaging said locking means, and an independent handle for governing the operation of said rolls, said last handle being so situated as to impede access to the first handle when said last handle is in the position it occupies while the rolls are running.

5. In combination, a clothes-wringer mounted to swing on a vertical axis, a drive shaft concentric with the pivot axis, operative connections between said shaft and the wringer rolls, and a plurality of independently movable, spring-pressed locking devices operative equally at all positions of said wringer to prevent swinging of the same.

6. In a device of the character described, in combination, a pair of brackets pivoted together and having interfitting parts which define surfaces of revolution about a common axis, one of said brackets being secured to a support and the other having a wringer secured thereto, a shaft journaled in each bracket, means operatively connecting said shafts, a plurality of independent spring pressed locking devices, carried by one of said brackets and adapted to engage the other bracket in all relative positions to prevent relative movement, and manually operated means for releasing said devices simultaneously.

7. In a device of the character described, in combination, a pair of brackets pivoted together and having interfitting parts which define surfaces of revolution about a common axis, one of said brackets being secured to a support and the other having a wringer secured thereto, a shaft journaled in each bracket, means operatively connecting said shafts, a plurality of clutching members carried by one of said brackets and engageable with the rounded part of the other bracket to secure the same against relative movement, and spring means normally pushing said members towards engaging position.

8. In a device of the character described, in combination, a pair of brackets pivoted together and having interfitting parts which define surfaces of revolution about a common axis, one of said brackets being secured to a support and the other having a wringer secured thereto, a shaft journaled in each bracket, means operatively connecting said shafts, a pair of roller clutches carried by one bracket and engaging the rounded part of the other bracket and adapted to prevent relative movement, one in each direction, spring means tending to force said clutches into engaging position, and manual means for disengaging said clutches.

9. In a device of the character described, in combination, a pair of brackets pivoted together, one of the same being secured to a support and the other having a clothes wringer secured thereto, a shaft journaled in each bracket, gearing for connecting said shafts in operative relation, a flat faced section interposed between said brackets and rigidly affixed to one of them, and spring-pressed locking means carried by said section adapted to engage the other bracket in movement preventing relation.

10. In a device of the character described, in combination, a pair of brackets pivoted together, one of the same being secured to a support and the other having a clothes wringer secured thereto, a shaft journaled in each bracket, gearing for connecting said shafts in operative relation, a flat faced section interposed between said brackets and rigidly affixed to one of them, a rounded portion carried by the other bracket and projecting into said section, and clutching means carried by said section adapted to engage the exterior of said rounded portion to prevent relative motion of said brackets.

In testimony whereof, I hereunto affix my signature.

WILLIAM V. ORR.